United States Patent
Krasadakis

(10) Patent No.: US 9,854,410 B2
(45) Date of Patent: Dec. 26, 2017

(54) TECHNIQUES TO FACILITATE A LIVE AUDIENCE EXPERIENCE ON A COMPUTING DEVICE

(71) Applicant: Microsoft Technology Licensing, LLC, Redmond, WA (US)

(72) Inventor: Georgios Krasadakis, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 14/726,994

(22) Filed: Jun. 1, 2015

(65) Prior Publication Data
US 2016/0353252 A1   Dec. 1, 2016

(51) Int. Cl.
| H04W 4/06 | (2009.01) |
| H04W 4/02 | (2009.01) |
| H04L 12/18 | (2006.01) |
| H04N 21/431 | (2011.01) |
| H04N 21/475 | (2011.01) |
| H04L 12/58 | (2006.01) |

(52) U.S. Cl.
CPC .............. *H04W 4/06* (2013.01); *H04L 12/18* (2013.01); *H04L 12/189* (2013.01); *H04L 12/1845* (2013.01); *H04L 51/20* (2013.01); *H04N 21/431* (2013.01); *H04N 21/475* (2013.01); *H04N 21/4756* (2013.01); *H04W 4/021* (2013.01); *H04L 51/38* (2013.01)

(58) Field of Classification Search
CPC ...... H04W 4/06; H04W 4/021; H04N 21/431; H04N 21/475; H04N 21/4756; H04L 12/18; H04L 29/06; H04L 65/403
See application file for complete search history.

(56) References Cited

U.S. PATENT DOCUMENTS

| 7,889,073 B2 | 2/2011 | Zalewski |
| 8,023,977 B2 | 9/2011 | Inselberg |
| 8,438,590 B2 | 5/2013 | Crenshaw |
| 8,535,131 B2 | 9/2013 | Packard et al. |
| 8,842,007 B2 | 9/2014 | Packard et al. |

(Continued)

FOREIGN PATENT DOCUMENTS

| WO | 2011031932 A1 | 3/2011 |
| WO | 2014102785 A1 | 7/2014 |

OTHER PUBLICATIONS

"International Search Report and Written Opinion Issued in PCT Application No. PCT/US2016/035124", dated Aug. 10, 2016, 10 Pages.

(Continued)

*Primary Examiner* — Chuong A Ngo

(57) ABSTRACT

Techniques to provide an online audience to an event with a live audience experience. The live audience refers to users who are physically present at a live event and the online audience refers to users who are viewing the event through those users' computing devices. These techniques connect these audiences by communicating content that reflects the live audience's emotional state to the online audience's computing devices. In some embodiments, these techniques enhance the online audience's live viewing of the event by augmenting the event's broadcast with a visual indicator that expresses the live audience's response to a specific moment that occurred during the event. Other embodiments are described and claimed.

20 Claims, 13 Drawing Sheets

(56) References Cited

U.S. PATENT DOCUMENTS

| | | | |
|---|---|---|---|
| 2011/0145041 A1 | 6/2011 | Salamatov et al. | |
| 2011/0225515 A1 | 9/2011 | Goldman et al. | |
| 2011/0321074 A1 | 12/2011 | Marin et al. | |
| 2012/0290508 A1* | 11/2012 | Bist | G06F 17/30035 706/10 |
| 2014/0168477 A1 | 6/2014 | David | |
| 2014/0229866 A1* | 8/2014 | Gottlieb | H04L 65/403 715/758 |
| 2014/0282651 A1 | 9/2014 | Baratz | |
| 2014/0363000 A1 | 12/2014 | Bowden et al. | |
| 2014/0366049 A1 | 12/2014 | Lehtiniemi et al. | |
| 2015/0074698 A1* | 3/2015 | Pinto | H04N 21/4756 725/14 |

OTHER PUBLICATIONS

"Location is everything: Measuring Visitor Behavior", Published on: Feb. 23, 2015, Available at: http://info.noldus.com/location-is-everything-measuring-visitor-behavior.

Salyards, et al., "Analysis of Coordinated Crowd Vibration Levels in a Stadium Structure", In Proceedings of 25th International Modal Analysis Conference, Feb. 2007, 6 pages.

"Second Written Opinion Issued in PCT Application No. PCT/US2016/035124", dated Apr. 20, 2017, 05 Pages.

"International Preliminary Report on Patentability Issued in PCT Patent Application No. OCT/US2016/035124", dated Aug. 10, 2017, 7 Pages.

\* cited by examiner

TECHNIQUES TO FACILITATE A LIVE AUDIENCE EXPERIENCE ON A COMPUTING DEVICE

BACKGROUND

Human beings have been attending live events since time immemorial and these events facilitated communication and cooperation between the human beings, advancing the human race itself. During these events, these human beings often interacted with each other as well as with the event itself. In modern times, human beings enjoy attending a wider variety of live events, such as concerts, tournaments, games and/or the like. Often, those humans unable to physically attend the live event are not only devoid of personal enjoyment but miss out on engaging with fellow humans and therefore are at a disadvantage. Unfortunately, broadcasting live coverage of these events has several restrictions of which one restriction is an almost zero tolerance for delays. As another restriction, the actual live coverage of these events is filtered and involves directed sampling of videos/image data, which limits the coverage itself in a number of ways.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to facilitate a live experience on a computing device. Some embodiments are particularly directed to techniques to facilitate a live experience on a computing device without using special equipment in a venue for the live experience and/or when the computing device is outside of a given radius from the venue. In one embodiment, for example, an apparatus may comprise a logic circuit and logic operative on the logic circuit to identify mass reaction indicia from motion data that corresponds to a first set of computing devices associated with a live audience and generate visual indicator data based upon the mass reaction indicia that is communicated to a second set of computing devices associated with an online audience. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
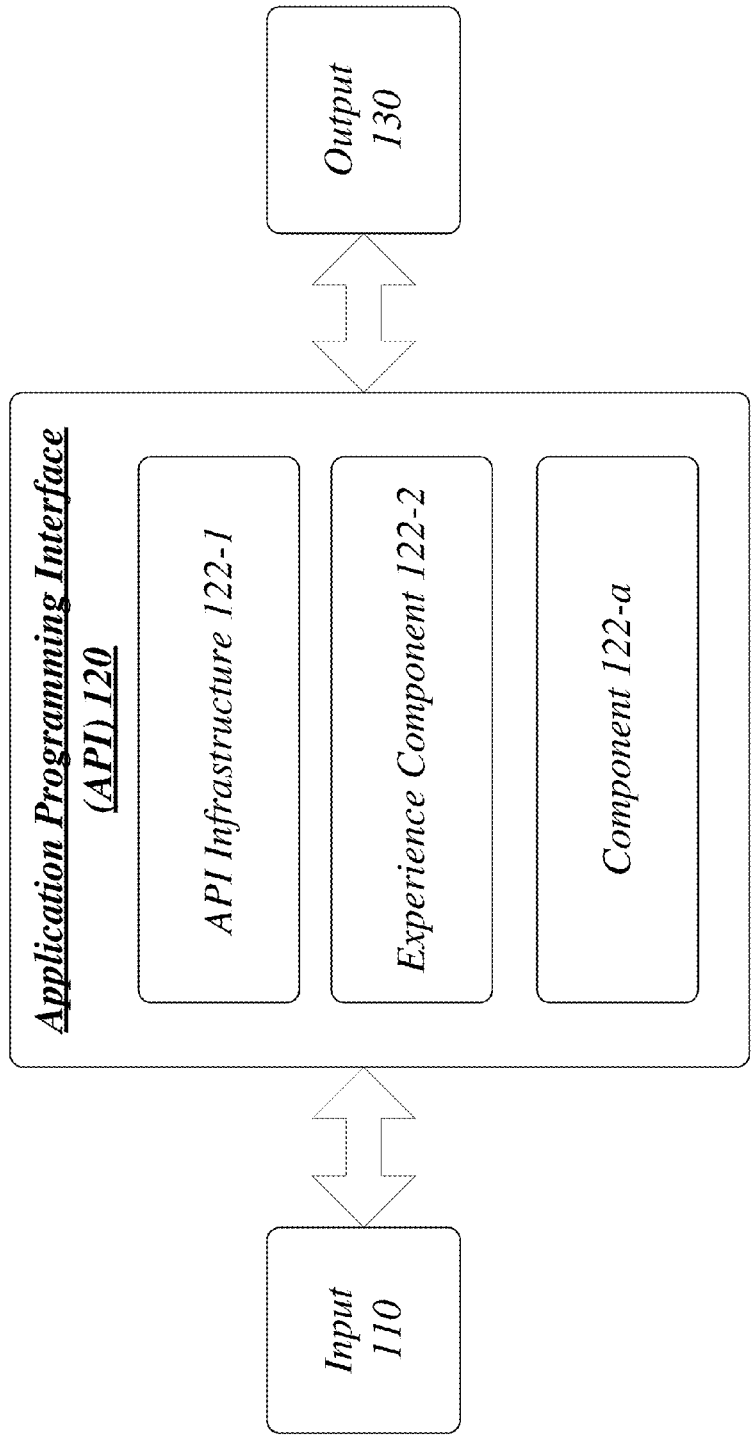
FIG. 1 illustrates an embodiment of a system to facilitate a live audience experience on a computing device.

Various embodiments are directed to monitoring an event's audience for reactions and facilitating that live audience's experience on a computing device of an online user. It is appreciated that this online user may or may not be in the audience. These embodiments may involve configuring the computing device to generate and display content conveying the live audience experience observed by those in a venue watching the event. The computing device, therefore, allows the online user, by viewing and/or engaging such content, to better sense the event's atmosphere or ambiance and track the event's changing rhythm. As described herein, such content may include a graphic/image, video/audio data, an animation as well as textual and numeric data.

Some embodiments implement user interface elements that, when activated, enable some form of interaction with a live audience member, the event and/or the venue itself—allowing the online user in certain instances to even participate in the live audience experience. It is appreciated that the embodiments described herein do not exclude any particular type(s) of events and include, but is not limited to, sporting matches, athletic tournaments, non-athletic competitions, artistic performances, musical concerts and other live events, and/or so forth.

Exemplary embodiments of the computing device include a mobile device (e.g., a smartphone, a tablet, or a wearable device) or a connected television (e.g., a smart TV) operative to render and display streaming multimedia data captured from cameras recording/broadcasting the event from the venue. In some embodiments, the content presented on the computing device augments the online user's viewing of the event through the device's audio/video capabilities. The content generated by the embodiments described herein may be presented via a portal that is configured a separate screen from the streamed multimedia data or on a separate portion (e.g., a side panel or a separate frame) of the screen or an overlaid user interface element.

To illustrate by way of an example, the online user views a video/audio feed of a sporting match on or the mobile device and a visual indicator to symbolize a pulse or rhythm of the sporting match is generated for display alongside the video/audio feed in a separate portal, such as in a different or a child user interface element. In one embodiment, this visual indicator is generated by capturing motion data from sporting match audience members, identifying concurrency patterns amongst the members' movements, interpreting the concurrency patterns, and computing a score or a series of scores representing the pulse or rhythm of the sporting match. Based upon such a score, an appropriate visual indicator is selected to express that pulse or rhythm; for example, the selected visual indicator may be proper in the context of the sporting match, such as a brown round ball graphic or animation for augmenting a basketball game. The visual indicator can have the form of a time-series or timeline presenting the levels of the rhythm of the game aligned with certain event moments. Moreover the visual indicator can be presented against a single timeline for the selected live matches providing a live comparison of matches based on their rhythm. The visual indicator additionally may direct the user to certain statistics corresponding to the basketball game.

It is further appreciated that in the above example, the online user may share in experiencing the live event through any software application program(s), such as a search engine service, a browser component, a notification system, a multimedia application, and/or the like. The software application program may include a first party application (e.g., a mobile application) or a third party application component (e.g., an add-in module). In some instances, the software application program may be extended to include the portal for displaying the visual indicator.

The computing device allows the online user to search and select a live match based on the rhythm of the game or the current level of excitement—a quantified live experience enabling comparison among live matches. Also allows the online user to search historical events (those completed already) using the level of excitement as filter and/or ordering criterion. As a result, the embodiments can improve affordability, scalability, modularity, extendibility, or interoperability for an operator, device or network and improved discoverability of live or completed events.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram of a system to facilitate a live experience on a computing device. In one embodiment, the system may comprise a computer-implemented system 100 having an Application Programming Interface (API) 120 comprising one or more components. Although the system 100 shown in FIG. 1 has a limited number of elements in a certain topology, it may be appreciated that the system 100 may include more or less elements in alternate topologies as desired for a given implementation. It is appreciated that in some embodiments, the system 100 operates in a cloud computing environment as a service.

The system 100 may comprise the API 120 generally arranged to serve content to online users for simulating a live audience experience on those users' computing devices. The API 120 may comprise a component depicted in FIG. 1 as API infrastructure 122-1, which may be generally arranged to monitor mobile device user movement and determine which users are attending a live event. These users form the live event's audience and the API infrastructure 122-1 analyzes motion data captured using their devices and identifies mass reactions from concurrent movement patterns correlated with the live event's progress. The API infrastructure 122-1 may generally be configured to perform data aggregation, scores adjustment, statistical computation, and comparative analysis to suitably summarize and visualize an overall rhythm (and/or its time series) of the live event. The overall rhythm or pulse may symbolized via any combination and sequence of data, statistics, scores representing the state and dynamics of the event, its audience synthesis, demographics, reaction statistics, sentimental state, and/or the like.

It is appreciated that the overall rhythm or pulse of the live event may be one example component of the live audience experience and the present disclosure envisions other components to express the live audience experience. These components may or may not be combined with the overall rhythm or pulse to comprise the live audience experience. In general, the live audience experience may be quantified using a series of values computed according to one or more metrics such that each value may represent one aspect of the live event. In addition to the pulse, one or more values may measure transitions in the pulse of the game between different moments or states in the live event and the variance of those transitions, the live audience's current emotional state, transitions in the live audience's emotional state over time and the variance thereof, size and synthesis of the live audience (e.g., demographic data), and or the like. Another example value measures an intensity identified between different subsets of the live audience, for instance, density rates for fans of a first team compared with fans of a second team in competition. In some embodiments, these values are used to simulate the live audience's experience at a particular moment during the event.

The API 120 may comprise an experience component 122-2 generally arranged to identify appropriate content to represent the live audience experience. Such content may be displayed to the online users to augment an online viewing of the event or on a separate information page. The experience component 122-2 may generate information corresponding to the appropriate content and/or communicate that information as output 130 to the computing devices of the online users who are connected to the API 120. These online users may request this information by following the live event and receiving push-notifications. The experience component 122-2 communicates data defining the mass reactions and instructions to prompt an application program running on a computing device to generate the appropriate content. As an alternative, these computing devices may receive either raw image data or rendered graphics depicting the appropriate content.

Figure 2:
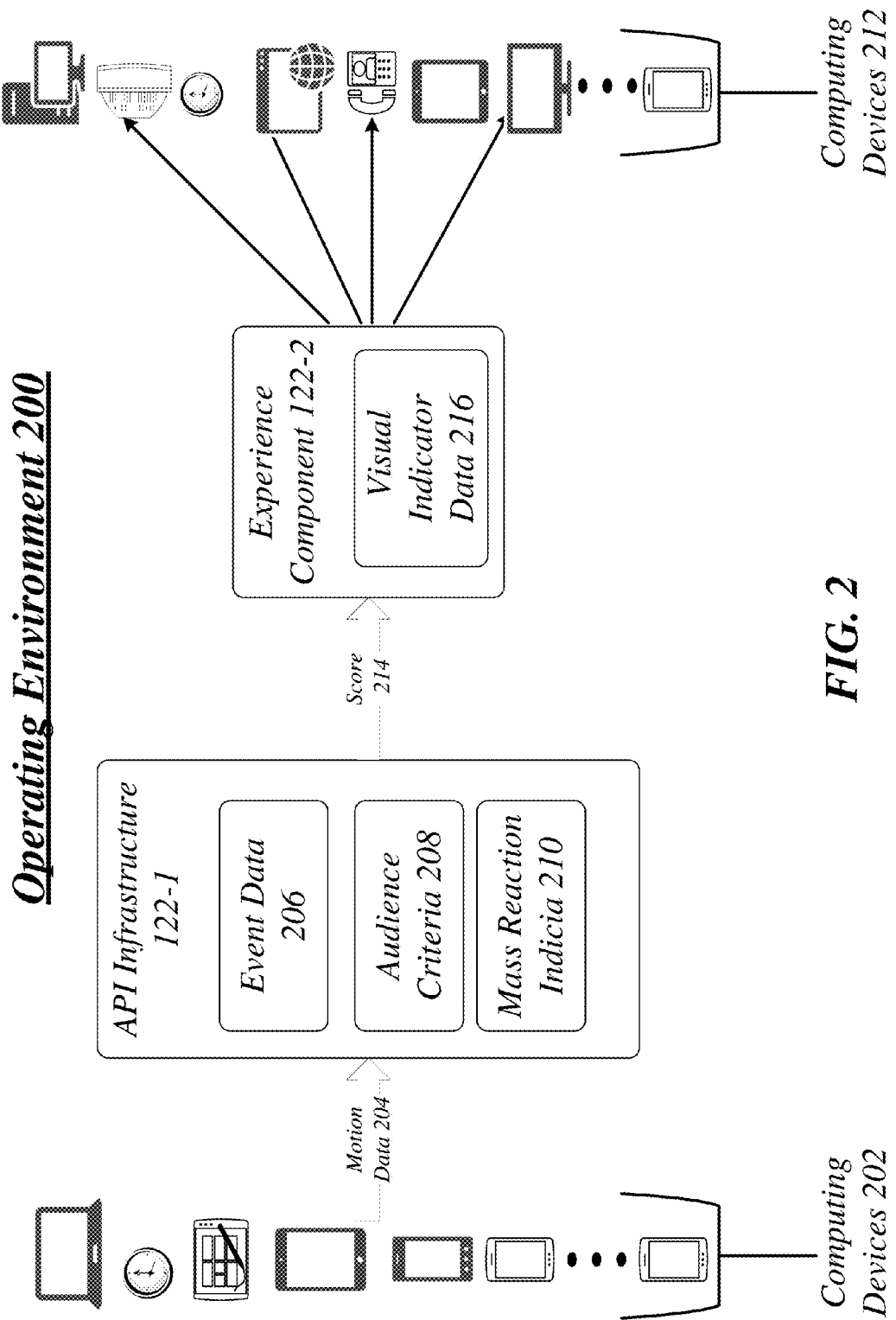
FIG. 2 illustrates a block diagram of an operating environment for the system of FIG. 1.

FIG. 2 illustrates an embodiment of an operational environment 200 for the system 100. As shown in FIG. 2, the operational environment 200 includes a plurality of computing devices 202 handled, carried and/or worn by audience members attending a live event. These audience members collectively may be herein referred to as the live audience or live event audience. As depicted in FIG. 2, the audience members may possess or control various types of the computing devices 202, such as a tablet, a mobile device (e.g., a smart phone), a laptop computer, a wearable device, and/or the like.

The computing devices 202 (along with their corresponding audience members) are located within a geographic area hosting the live event or surrounding a venue for the live event. In some embodiments, the computing devices 202 record Global Positioning System (GPS) coordinates and over time, generate motion data 204 through an appropriate device and regularly submit the GPS coordinates to the API infrastructure 122-1 for further processing of the changes in the GPS coordinates. Examples of appropriate devices include an accelerometer, a proximity sensor, a gyroscope, a magnetometer, a SensorCore, a compass and/or the like. Alternative embodiments of the computing devices 202 broadcast the GPS coordinates and the motion data 204 for other devices to listen and record. As an option, the computing devices 202 may allow a network storage device to remotely store the motion data 204.

One example implementation of the computing devices 202 communicates the motion data 204 to the API infrastructure 122-1, which in turn aggregates the motion data 204 and/or the associated GPS coordinates to classify user activities. The API infrastructure 122-1 may determine whether a considerable number of the computing devices 202 are located within a geographic area, indicating that the computing device 202 users also are gathered in that area. As one example, the API infrastructure 122-1 compares the aggregated motion data 204 to event data 206 to determine whether there is a live event taking place in the same geographic area, such as a sporting match. The API infrastructure 122-1 may identify the live event according to available scheduling information and venue (e.g., stadium) location information. The API infrastructure 122-1 identifies the live audiences of the identified live match using a threshold concentration or density of users in a reasonably extended geographic area around the venue location. Once the contemporaneous or upcoming live event is identified, the API infrastructure 122-1 utilizes audience criteria 208 to determine whether the computing devices 202 users constitute an audience. For example, the audience criteria 208 prescribes certain conditions, thresholds, etc. that must be satisfied in order to classify the computing devices 202 as the live audience for the purpose of mining information, such as mass reaction indicia 210. The audience criteria 208 maintains different audience formation thresholds for different event types (for instance a sport versus a music performance), for different event subtypes (for instance a soccer match versus a tennis match) for different markets and cultures, for different seasons and also the exact occasion (for instance low-interest matches may have lower audience thresholds—as function of the expected live audience size). The audience criteria 208 enhances the logic which enables accurate live audience identification.

The API infrastructure 122-1 may further process the motion data 204 generated by these devices 202, such as when an audience member moves a considerable distance or in a particular manner. The motion data 204 may store attributes defining the audience member's movement, for example, in terms of magnitude, direction, style, acceleration, curve, duration, sequence of movements, and/or the like. It is appreciated that the motion data 204 may use other types of attributes to identify audience member movement, such as angular movement and length.

According to one embodiment, the API infrastructure 122-1 aggregates the motion data 204 and identifies concurrent movement patterns amongst at least a non-trivial number of the computing devices 202. The API infrastructure 122-1 may transform the concurrent movement patterns into various analytics as described herein. This may be beneficial when determining whether a user's movement is a reaction to a pivotal moment or climax during the event or is a non-event related movement. For example, if a considerable number of the computing devices 202 show a substantially similar movement pattern within a relatively short time period (e.g., a reaction time frame (RTF)), there is a strong likelihood that the users of those devices are experiencing a mass reaction. By correlating the concurrent movement patterns with the event data 206, the API infrastructure 122-1 determines whether the correlation indicates a mass reaction in response to a particular event state. If, for instance, the API infrastructure 122-1 determines that the movement patterns coincided in time with the event's pivotal moment or climax, data mapping that moment or climax to the movement patterns is stored in the mass reaction indicia 210.

As depicted in FIG. 2, the online audience members may possess or control various types of computing devices 212, such as a tablet, a mobile device (e.g., a smart phone), a laptop or a desktop computer, a wearable device, a VOIP phone, a connected display, a connected television (e.g., a smart TV) and/or the like. Some of the computing devices 212 include those devices that are without (e.g., outside) the geographic area of the event in contrast to the computing devices 202. Some users of the computing devices 212 view data related to the event's progression and therefore, form an online audience for the event. Some users of the computing devices 212 also are distributed amongst live audience members. In response to requests from one or more of the computing devices 212, the experience component 122-2 processes a score 214 or a series of scores 214 to represent a current state of the event and identifies visual indicator data 216 for display on those devices, according to some example embodiments. The API infrastructure 122-1 may analyze a portion of the mass reaction indicia 210 that pertains to a recent time period and compute the score 214 as a measurement denoting the event's ambiance (e.g., vibe), including the live audience's emotional condition, and other statistics. To illustrate by way of example, if a score is higher than another score, the difference may indicate a more enthusiastic and excited crowd for the event with the higher score. In this same example, if the score is trending up may indicate that the event is becoming more interesting than another one with a higher but trending down score.

One example implementation of the experience component 122-2 generates various content based upon the score 214 that is for display on the computing devices 212 to convey the current state of the event to the device users. Such content may include visual indicators of the live audience experience. In another example implementation, the experience component 122-2 generates the visual indicator data 216 to include instructions for the computing devices 212 to execute when rendering the various content.

Figure 3:
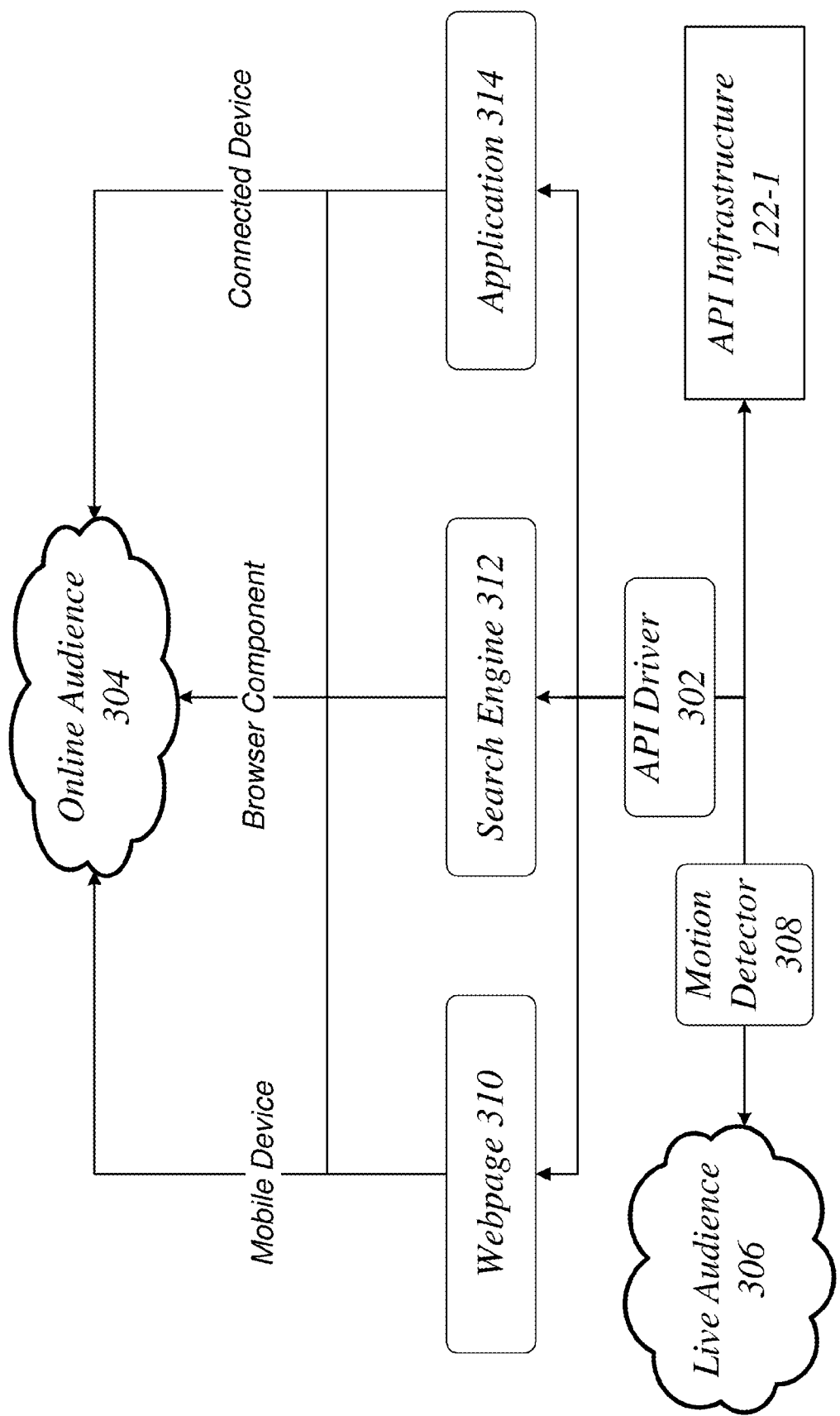
FIG. 3 illustrates a functional block diagram of an operating environment for the system of FIG. 1.

FIG. 3 illustrates a functional block diagram of an operating environment for the system of FIG. 1. As shown in FIG. 3, the operating environment 300 includes various elements that cooperate to simulate a live audience experience for computing devices users who are not present at the live event. The operating environment 300 includes an instance of the API 120 that is operative to provide the computing devices in an online audience 304 with content representing a state (e.g., an emotional state) of a live audience 306. An API driver 302 may be configured to expose the API instance's functionality to applications running on those computing devices. The content provided through the API driver 302 may indicate how the live audience's state evolves as the live event progress as well as comparative data with other events. The API driver 302 may process motion data generated by a motion detector 308 (e.g., an accelerometer or another appropriate device) running on each live audience member's computing device and invoke functionality provided by the API infrastructure 122-1, as described herein, to identify mass reaction indicia for the event. The API driver 302 may instruct the API infrastructure 122-1 to compute a score representing the current state of the event based upon the mass reaction indicia.

The API driver 302 may execute code to identify appropriate content to express the event's current state, such as a visual indicator for the score in the form of an animated graphic. According to various example embodiments, the API driver 302 may respond to requests from the online audience 304 by returning visual indicator data that facilitates the presentation of the animated graphic through requesting computing devices. It is appreciated that in some instances, the API driver 302 may respond to a particular computing device with custom visual indicator data. Hence, the API driver 302 may return data that is appropriate for multiple computing device types or is specific to a certain device type and different computing device types may receive different data.

Note, a computing device may process the visual indicator data differently depending upon which application(s) requested such data. One example implementation of the API Infrastructure 122-1 returns HTML or XML data to a mobile device to embed in a webpage 310 such that the mobile device displays the visual indicator when displaying the webpage 310 on a portal. As an alternative, a mobile sports application executed on the mobile device may generate the visual indicator on a content page or another user interface element. Another example implementation of the API Infrastructure 122-1 returns statistics, scores and the visual indicator in the form of raw image data to a search engine 312 and the search engine 312 includes this data and/or visual indicator directly into a search result listing. The search engine 312 is a web-based server loaded by a browser component to a computing device's operating system. Yet another example implementation of the API Infrastructure 122-1 returns statistics and scores along with an animation to an application (e.g., a third party application) that executed on a connected device, such as a connected TV. Furthermore, a combination of applications may be employed to display the visual indicator; for example, the connected device either employs the browser component or an alternative mechanism to render the animation via the application 314. The mobile device, as an example, may employ the browser component to display the visual indicator on the webpage 310 or, alternatively, use another mechanism capable of correctly executing the HTML or XML data. This alternative mechanism can be an application implementing specific components of the techniques described herein. In other cases the component may be a third party application and/or pre-installed components at an operating system level.

By way of example, some embodiments of the operating environment 300 apply to a live sport game between two teams of players, such as a soccer game or a baseball game, in which the API Infrastructure 122-1 is operative to augment the live sport game with various content that reflects the live audience's experience. As described herein, the API Infrastructure 122-1 may provide content that comprises visual indicators and data of the live audience emotional responses to certain moments during the sport game. Because the sport game involves a competition between adversaries, there should be at least two discernable subsets of the live audience 306 of which one subset consists of one team's fans and another subset consists of another team's fans. In some embodiments, the API driver 302 may generate different visual indicators for each subset's live experience such that one visual indicator expresses one team's fans' emotional state and another visual indicator expresses another team's fans' emotional state. The present disclosure envisions other classifications of live audience members other than one team's fans, such as those who are neutral or non-fans. It is appreciated by the present disclosure that those fans may receive neutral or impartial visual indicators. Accordingly, the API Infrastructure 122-1 may customize the visual indicators to match the online audience member's team preference.

The following description discloses various embodiment to identify the sport game and classify attending mobile device users as the live audience 306 for the sport game. In one such embodiment, within a specific market of interest, the API infrastructure 122-1 provides a daily sports games schedule as event data. For each game in the daily schedule, the API infrastructure 122-1 generates a thread to listen for motion data from the motion detector 308. The thread may be auto-initiated to listen at a pre-determined number of minutes prior to game start. Each thread identifies, registers and manages the game's live (in-stadium) audience 304. A user with a motion detection-enabled mobile device enters a stadium and broadcasts GPS coordinates to that effect. In some embodiments, the motion detector 308 may be a component of a mobile sports application running on the mobile device. Once the API infrastructure 122-1 identifies the GPS coordinates submitted by the mobile device as within the radius of the stadium, the user's identity is checked against the corresponding live audience. If the user is not already enlisted, then API infrastructure 122-1 registers the user and his/her the mobile device as a live audience member.

The API infrastructure 122-1 executes code configured to monitor the mobile device users in the stadium, determines a concentration rate, and when a critical mass for the game is met, the API infrastructure 122-1 classifies the mobile device users as the live audience 306 and starts analyzing the motion data generated by these users. The critical mass for the game may be defined as a minimum size of an in-stadium audience. The minimum size may change per game, per team, per sport, per season or even for certain weather conditions for outdoor live events. For each user identified in the live audience, the API infrastructure 122-1 generates analytical data (e.g., statistics and metadata) for that user's movement across the duration of the event and compares this data against predefined singular movement patterns for the specific type of event and/or culture.

In one example embodiment, the API driver 302 loads movement patterns for known mass reactions into the API Infrastructure 122-1 and/or into the mobile sports application of the mobile device. The movement patterns may be specific to the sport being played. The API Infrastructure 122-1 and/or the mobile sports application of the mobile device analyzes the captured motion data and identifies, amongst the live audience members, concurrent movement patterns within a time period (e.g., a Reaction Time Frame (RTF)). By comparing the concurrent movement patterns to the loaded movement patterns, the API Infrastructure 122-1 and/or the mobile sports application of the mobile device identifies mass reactions corresponding to significant moments or highlights in the game. These mass reactions are used to compute a pulse of the game. They are also used for looking up specific moments that occurred within the game. The API Infrastructure 122-1 and/or the mobile sports application of the mobile device is continuously analyzing live audience movement, for example, every few seconds (depending on event type), to generate a timeline depicting a series of pulse scores and statistics capturing the dynamics of the state of the event.

The API Infrastructure 122-1 and/or the mobile sports application of the mobile device compares a distribution of the concurrent patterns against various audience criteria. For instance, the API Infrastructure 122-1 computes a significance of each identified pattern using the total in-stadium live audience estimated size, the in-stadium audience team, a history of reactions within the stadium or for the specific teams, among others. The API Infrastructure 122-1 uses the computed significance as a weight when computing a pulse score. If a frequency of the concurrent pattern is below a pre-defined threshold rate, the Reaction Time Frame (RTF) is sealed. After the Reaction Time Frame (RTF) is sealed, the API Infrastructure 122-1 opens a new RTF to capture succeeding concurrent patterns and identify moments of importance, including the live audience's mass reactions. If there is no moment of importance across the new RTF, the new RTF is sealed as silent. Each sealed moment is aggregated and analyzed to generate a real time pulse score or a running overall pulse score. It is appreciated that the API Infrastructure 122-1 recognizes and omits scheduled breaks during the game. The API Infrastructure 122-1 updates the market specific set of live matches with comparable pulse scores.

To illustrate even further how live audience members react to certain game moments and express themselves with specific movements, the following describes at least some example live audience member movements. Some audience members mostly express themselves with specific, 'universal', 'natural' movements. This may occur when the game starts but as the game progresses, any activity or moment causing the audience to react with a certain movement (e.g., to stand-up, to jump, to applause, and/or the like) is captured and analyzed in search of "concurrency movement patterns" or a non-trivial absence of such patterns. A time period during which no noticeable movement occurred may indicate a depressed emotional state for the live audience, possibly due to a poor showing and/or a loss by the live audience's favorite team. Alternatively, the live audience's emotional state may be indifferent or idle over the same time period.

The concurrency movement patterns may be compared with metadata defining preference data for either an online audience member or a live audience member. The preference data may indicate a favorite team or teams as well as personalization options for the application to view the pulse score. The preference data may comprise additional information on any implicitly identified favorite team (e.g., through the history of live, in-stadium audience participations) and additional demographics. This comparison, therefore, produces various statistics such as the size, estimates of fans for each of the team and more, using the available metadata for each user. The concurrency movement patterns may be used to compute a pulse score to quantify the game's rhythm (e.g., a running state). The pulse score may be adjusted based on known previous mass reactions and/or in view of different styles of different sports across different countries. Based upon this score, an appropriate visual indicator is selected to express the game's rhythm; for example, the visual indicator may include a graphic image of an object that is proper in the context of the sporting match, such as a round ball for a basketball game.

Figure 4:
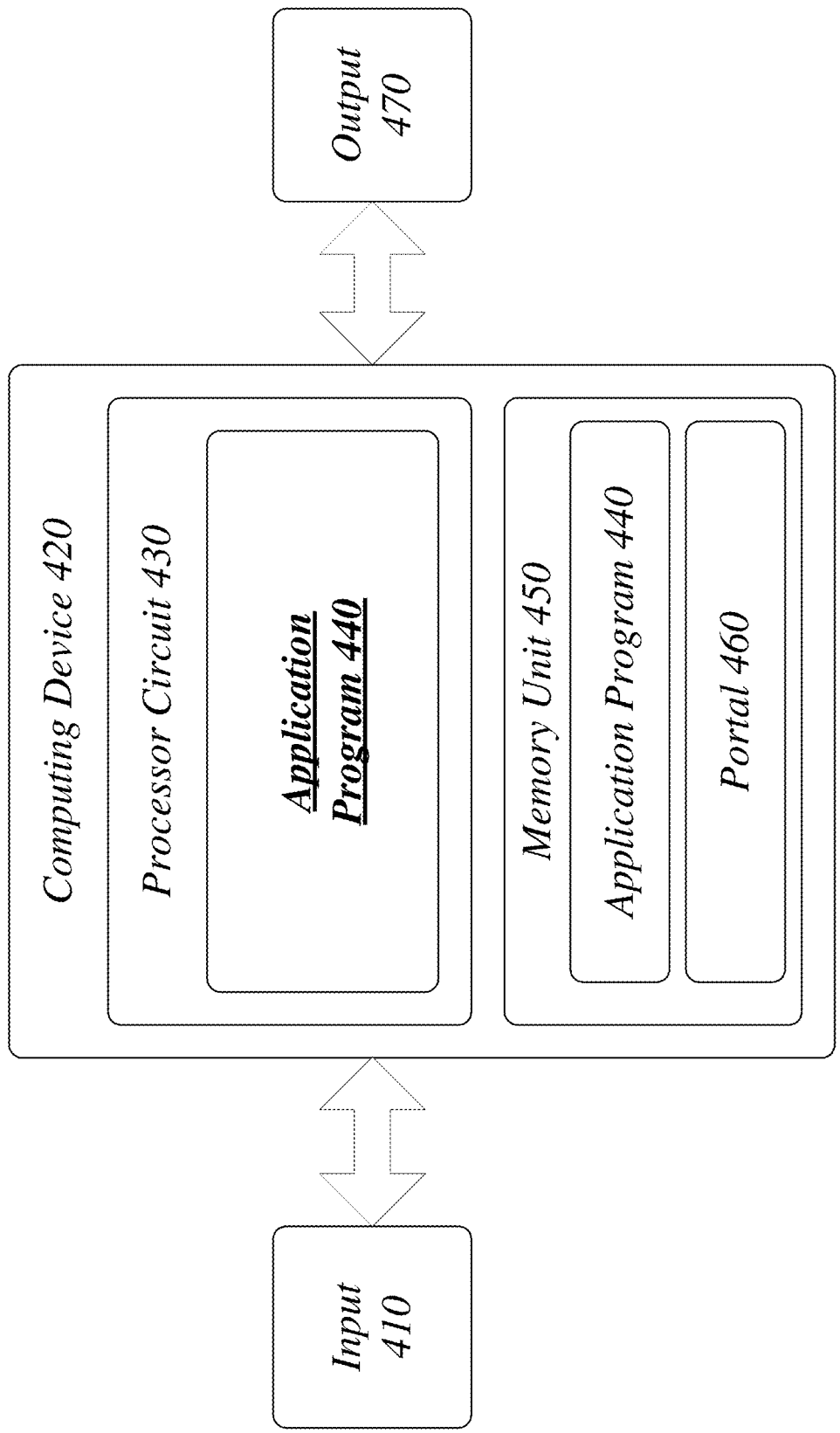
FIG. 4 illustrates an embodiment of a computing device to display the live audience experience.

FIG. 4 illustrates an embodiment of a computing device of FIG. 2. As shown in FIG. 4, a computing device 420 includes a processor circuit 430 comprising processor-executable instructions or object code for an application program 440. The computing device 420 further includes a memory unit 450 to store source code for the application program 440. The application program 440 may run as a desktop software application, a mobile application for a mobile device (e.g., a smartphone, tablet or wearable), an application for a connected television and/or the like. The application for the mobile phone or tablet may be a third-party application or a trusted application, such as a browser component.

One example implementation of the application program 440 may be a mobile sports application that is in a trusting relationship with the API 120 of the system 100 of FIG. 1 and therefore, can provide motion data for the API 120 via a motion detector component and display custom content through a portal 460. The mobile sports application may run on a live audience member's mobile device to capture that member's movements as input 410 and communicate the observed motion data as output 470 to the API 120. After aggregating motion data captured by the live audience and comparing the aggregated motion data to historical movement patterns, the API 120 returns instructions for generating appropriate content to express the live audience's mass reaction to a current moment during the game (i.e., a pulse of the game). The mobile sports application may display the appropriate content via the portal 460 as described herein. If the live audience member leaves the stadium before the game ends, the mobile sports application continues to display content for live audience mass reactions; hence, the mobile sports application is configured to operate for both the live audience members and non-live audience members, such as those watching the game online.

The memory unit 450 stores data representing the portal 460 through which visual indicators of a live audience state are displayed as rendered content. The application program 440 may generate the portal 460 to be a user interface component in one example implementation or as an extension or standalone user interface according to an alternative implementation. For instance, the application program 440 may be a browser component that generates a webpage to display the content or a mobile application that controls a layout structure for the portal 460. Alternatively, a search engine may add a sports component (e.g., a sports tab) to the main search page or enrich the search listing with the pulse of the game scores and visual indicators. Even the browser component may be extended by configuring a tab element or a bar element with a data feed to the content to be displayed.

Figure 5:
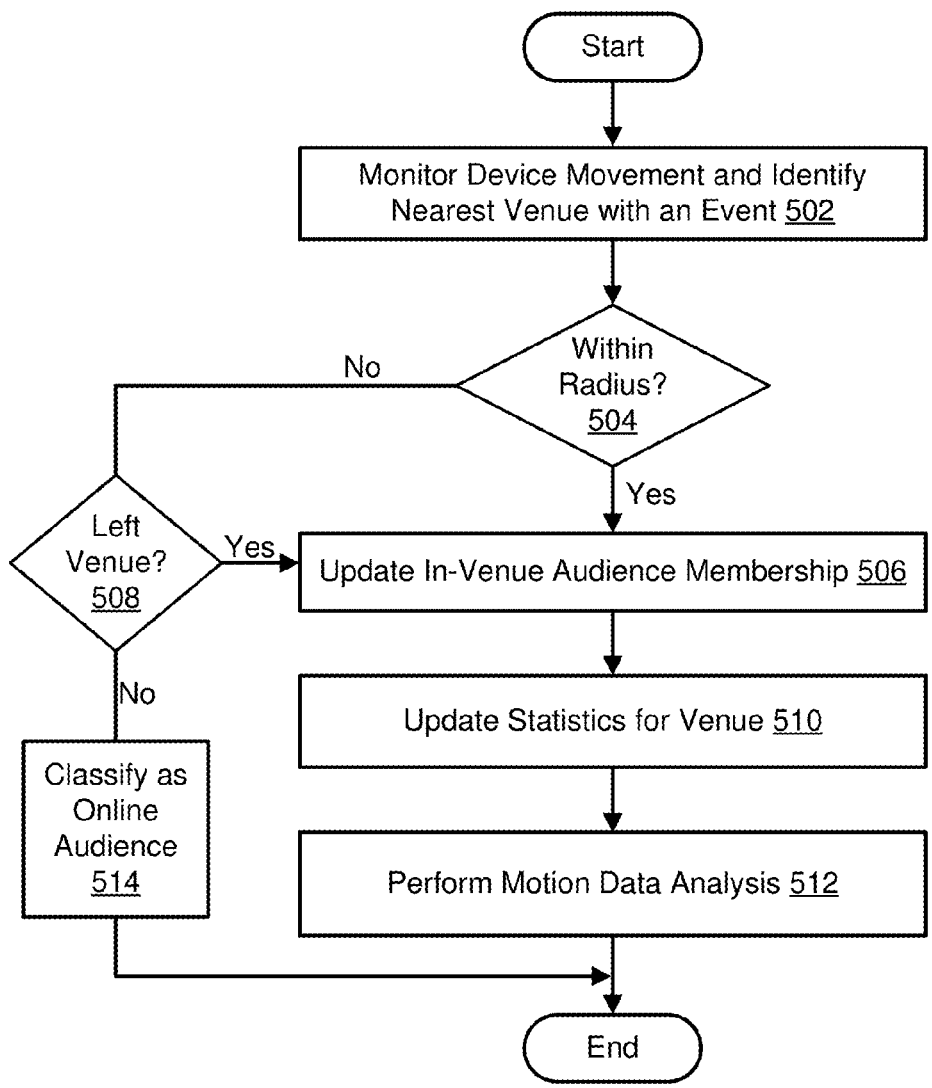
FIG. 5 illustrates an embodiment of a logic flow for the system of FIG. 1.

FIG. 5 illustrates an embodiment of a logic flow 500 for the system of FIG. 1. The logic flow 500 may be representative of some or all of the operations executed by one or more embodiments described herein.

In the illustrated embodiment shown in FIG. 5, the logic flow 500 starts at block 502 where the logic flow 500 monitors device movement and identifies a nearest venue with activity. For example, an API running within the system 100 captures motion data (e.g., GPS coordinates) generated by a mobile device and compares that data with venue information to determine whether a mobile device user is located within the venue's geographic area or is moving towards that location when the venue is hosting some activity including any live event, such as a sporting match.

The logic flow 500 may proceed to block 504 to determine whether the mobile device is located within a radius of the venue's geographic area. This radius may be pre-determined for the venue or may be dynamically adjusted based upon observed live audiences at the venue. Nonetheless, if the mobile device can be located within the radius, the logic flow 500 classifies the mobile device user as a live audience member at the venue and updates live audience membership at block 506. If, however, the mobile device is not located within the radius, the logic flow 500 determines whether the mobile device user left the venue at block 508; and if so, the logic flow 500 proceeds to the block 506 to remove that user as a live audience member and update the live audience membership. This may be accomplished by comparing the mobile device user's identifier to a list of user identifiers corresponding to mobile device users that previously entered the venue.

The logic flow 500 may update statistics for the venue at block 510. For example, a total number of live audience members is incremented and the mobile device user's identifier is added to the list of such members. The logic flow 500 may perform a motion data analysis at block 512, for example, to identify mass reaction indicia as described herein. Otherwise, the logic flow 500 classifies any remaining mobile device user as a potential online audience member. When a mobile device requests the live audience experience for the event, the mobile device confirms the classification as an online audience. The embodiments are not limited to this example.

Figure 6:
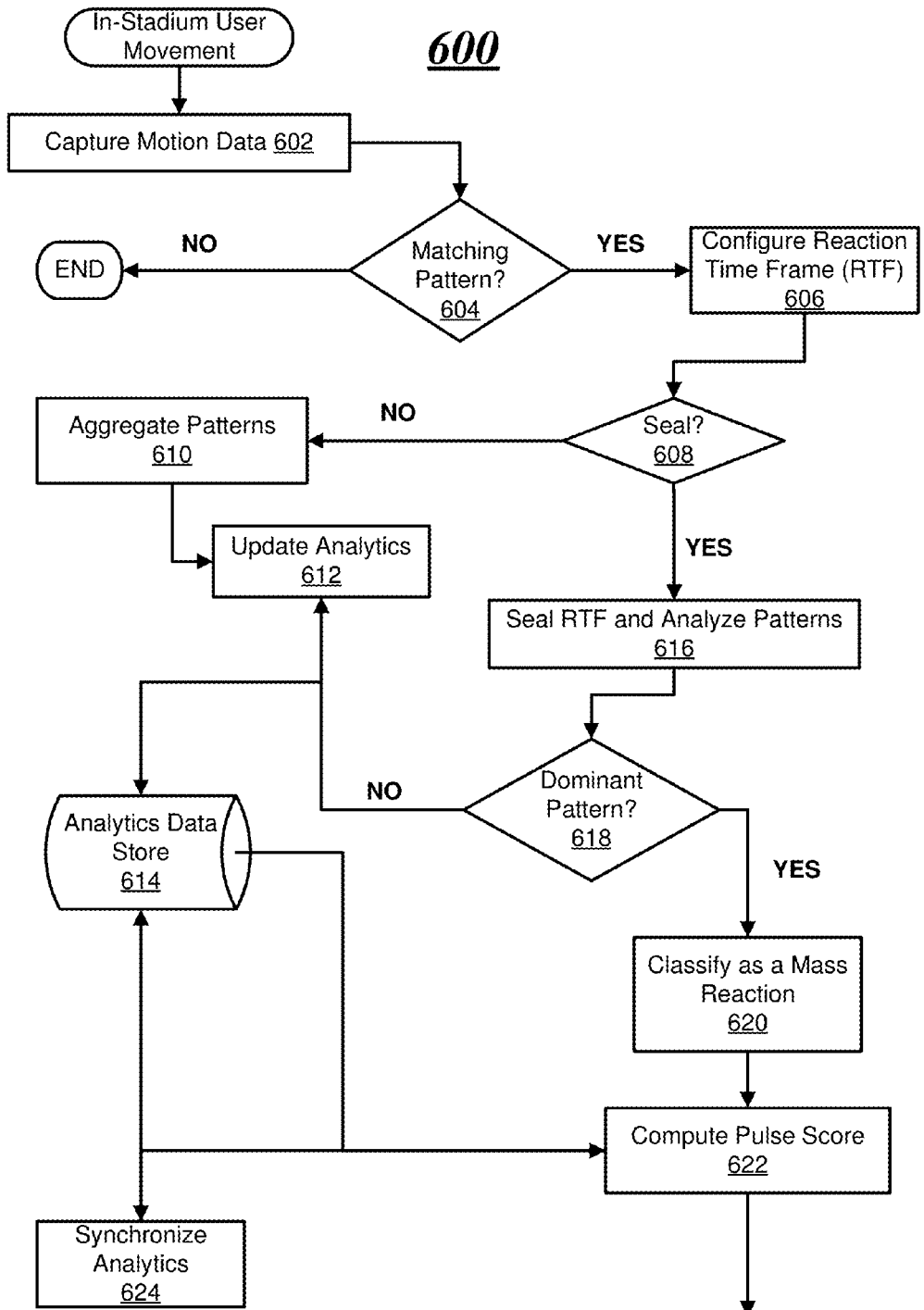
FIG. 6 illustrates an embodiment of a logic flow for the API infrastructure of the system of FIG. 1.

FIG. 6 illustrates an embodiment of a logic flow 600. The logic flow 600 may be representative of some or all of the operations executed by one or more embodiments described herein. In some embodiments, the API infrastructure of the system of FIG. 1 executes the logic flow 600.

In the illustrated embodiment shown in FIG. 6, the logic flow 600 performs a motion data analysis that commences at block 602 where the logic flow 600 captures motion data corresponding to in-stadium user movement. The logic flow 600 performs a pattern matching operation at block 604 by comparing live audience movement patterns with pre-determined movement patterns and determines whether any of those match a specific user's movement. These pre-determined movement patterns may be generic to any event or specific to a certain sport. If the pattern matching operation (at 604) results in finding at least one matching pattern with a certain level of confidence, the logic flow 600 proceeds to block 606 and configures a new reaction time frame (RTF) for the matching pattern(s) or joins those matching pattern(s) associated with a current RTF. The logic flow 600 may set the RTF to a specific time period (e.g., sixty (60) seconds) within which mass reactions are likely to be identifiable in data. The RTF may be specific to the moment within the game (for example, within a soccer game, celebration for a goal event could last 60 seconds while for a penalty only for 20 seconds). Otherwise, the logic flow 600 ends due to a lack of a matching pattern and returns control to block 608.

The logic flow 600 determines whether to seal the RTF at block 608. This may occur when the matching patterns identified at the block 604 are fewer in number than a threshold. The logic flow 600 uses the context of the match [event] and the specific in-game event type in order to generate the Expected Reaction Duration for each case. The logic flow 600 at block 606 analyzes the actual, relative fadeout rate of the concurrent patterns in the current (unsealed) RTF and identifies a critical value to seal the RTF based on the expected time-series shape and also the rate of reduction of patterns registered. The critical values may depend on the event type. If the RTF is sealed, a new RTF commences and old movement patterns are being aggregated and analyzed at block 616. If, however, the logic flow 600 made a determination not to seal the RTF, the logic flow 600 aggregates the matching patterns at block 610. The logic flow 600 updates analytics data for the event at block 612, which is stored in an analytics data store 614 and when needed, directed to block 622 to compute a pulse score. If the logic flow 600 determines to seal the RTF at block 608, the logic flow 600 proceeds to block 616 to seal the RTF and analyze the matching patterns in the sealed RTF.

The logic flow 600 determines at block 618 whether there is at least one dominant pattern amongst the matching pattern(s) in the RTF and if so, the logic flow 600 classifies the at least one dominant pattern as a mass reaction by the live audience to a significant event moment at 620. Then, the logic flow 600 computes a pulse score at block 622 to represent a current state of the sporting match, which may be influenced by the mass reaction. The logic flow 600 synchronizes the pulse score and the mass reaction with the analytics data store 614 at block 624. As an example, the logic flow 600 appends the score and supportive statistics into a time line of scores for the entire event. The embodiments are not limited to this example.

Figure 7A:
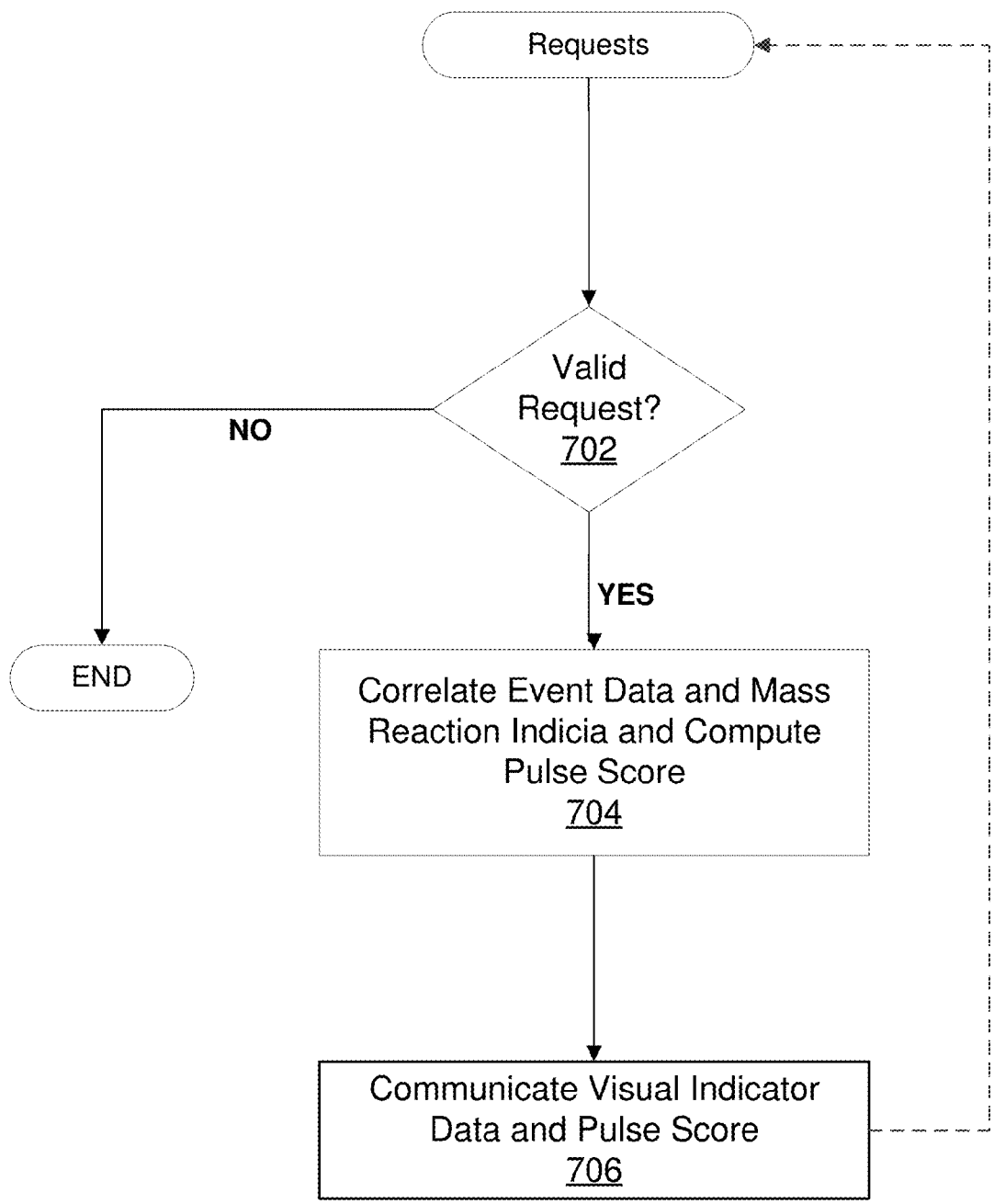
FIGS. 7A-B illustrates an embodiment of a logic flow for an online audience and a live audience of the system of FIG. 1.
Figure 7B:
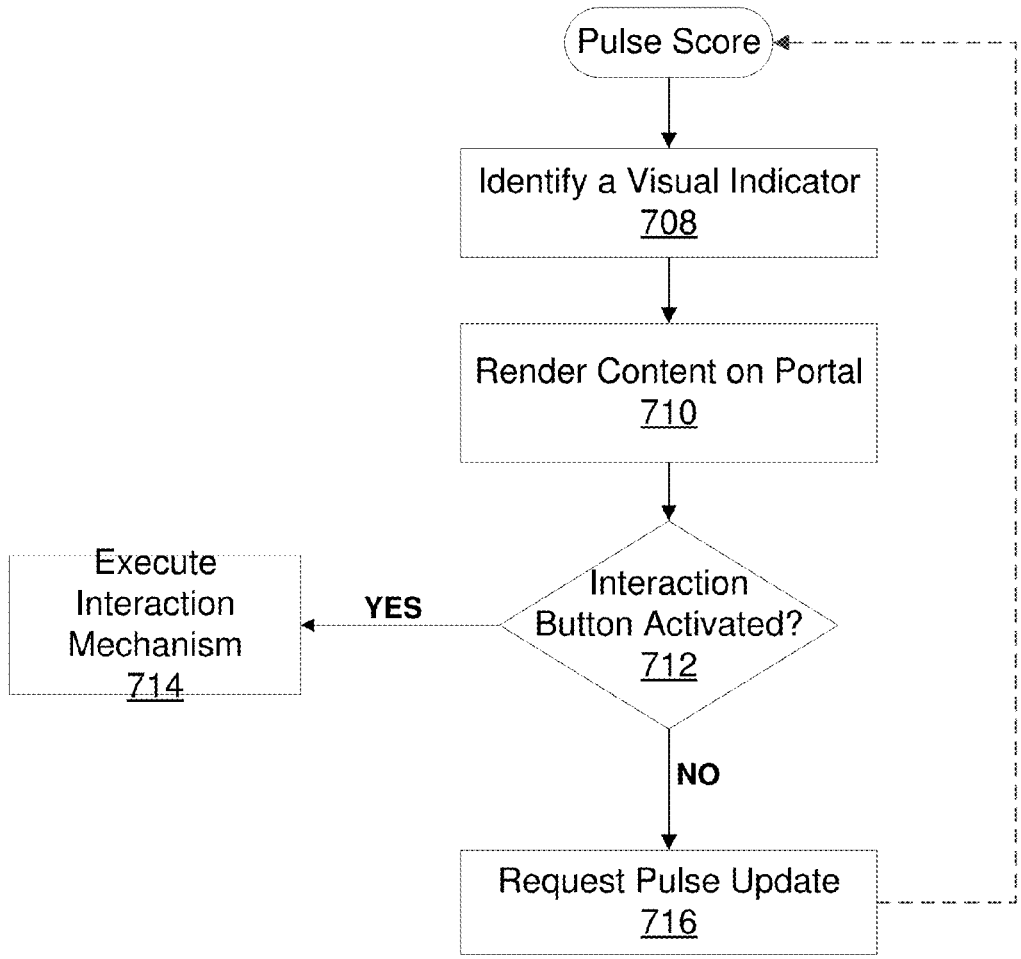

FIGS. 7A-B illustrate an embodiment of a logic flow 700 for the system of FIG. 1 and an online audience. FIG. 7A illustrates an embodiment of a portion of the logic flow 700 performed by the API of the system 100 of FIG. 1. The logic flow 700 may be representative of some or all of the operations executed by one or more embodiments described herein.

In the illustrated embodiment shown in FIG. 7A, the logic flow 700 receives requests from one or more computing devices in use by online audience members and, at block 202, determines whether a given request from one such device is a valid request. For example, only registered online audience members can receive visual indicators of a live audience experience and any request from an unregistered device is declared invalid. If the given request is invalid, the logic flow 700 ends.

If the request is valid, the logic flow 700 proceeds to block 704 and correlates match data and mass reaction indicia to compute a pulse score corresponding to the overall live audience experience. As described herein, the pulse score may quantify the relationship between a current state of the event and the live audience's emotional state. This may involve identifying pivotal event moments where the live audience's engagement was replete with noticeable emotional responses. These moments may involve high levels of excitement, such as when a national soccer team scores a winning goal in a world tournament. Based upon these moments, the logic flow 700 may proceed to compute a pulse score at block 704 and then, use the pulse score to generate visual indicator data to communicate to the connected online audience member's computing device at block 706. The visual indicator data generally identifies content configured to express or simulate the live audience experience as manifested in the mass reaction indicia. The visual indicator data may include statistics and other data to present with the content. The logic flow 700 may serve a next request by returning to block 702. The embodiments are not limited to this example.

FIG. 7B illustrate an embodiment of a portion of the logic flow 700 performed by the online audience's computing devices. In the illustrated embodiment shown in FIG. 7B, the logic flow 700 receives the pulse score that quantifies the live audience's emotional state in relation to the current state of the event and proceeds to identify a visual indicator at block 708. In one example embodiment, visual indicator includes an animation that conveys the live audience experience denoted by that pulse score. One example visual indicator is an animated beating heart that beats at a frequency determined by the pulse score where a higher pulse score corresponds to a faster beating heart animation.

The logic flow 700 may render content on a portal to display the visual indicator at block 710. In some embodiments, the logic flow 700 generates the portal as a separate user interface or a webpage. In other embodiments, the logic flow 700 generates the portal to extend an application, such as a search engine or a browser component, with the content. As an alternative, the logic flow 700 may render the content on a third party application's portal.

The logic flow 700 may determine at block 712 whether an interaction button was activated on the portal. As described herein, the interaction button refers to a user interface element configured to provide an interaction mechanism for the computing device, which may be used by the online user to communicate with a live audience member or the venue itself. If the interaction button was activated, the logic flow 700 proceeds to block 714 and executes the interaction mechanism. If, on the other hand, the interaction button was not activated, the logic flow 700 proceeds to block 716 and requests an updated pulse score from the API of the system 100 of FIG. 1.

Figure 8:
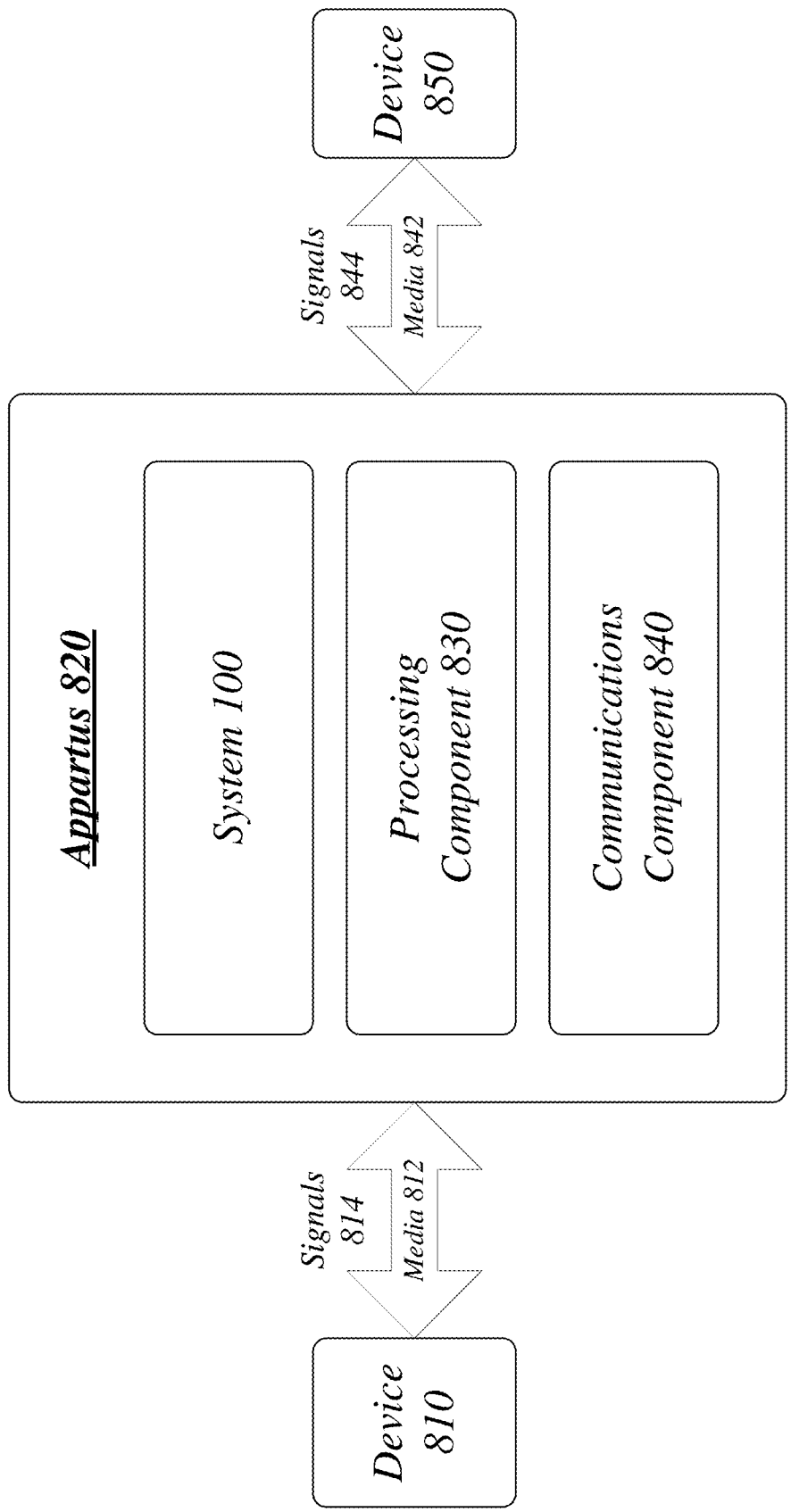
FIG. 8 illustrates an embodiment of a centralized system for the system of FIG. 1.

FIG. 8 illustrates a block diagram of a centralized system 800 for the system of FIG. 1. The centralized system 800 may implement some or all of the structure and/or operations for the system 100 in a single computing entity, such as entirely within a single apparatus 820.

The apparatus 820 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The apparatus 820 may execute processing operations or logic for the system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The apparatus 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The apparatus 820 may communicate with other devices 810, 850 over a communications media 812, 842, respectively, using communications signals 814, 844, respectively, via the communications component 840. The devices 810, 850 may be internal or external to the apparatus 820 as desired for a given implementation. In some embodiments, the devices 810, 850 include mobile devices that run a mobile application to capture motion data when the devices 810, 850 are located in an event venue and translate the motion data into a score representing a pulse or overall state of the event.

Figure 9:
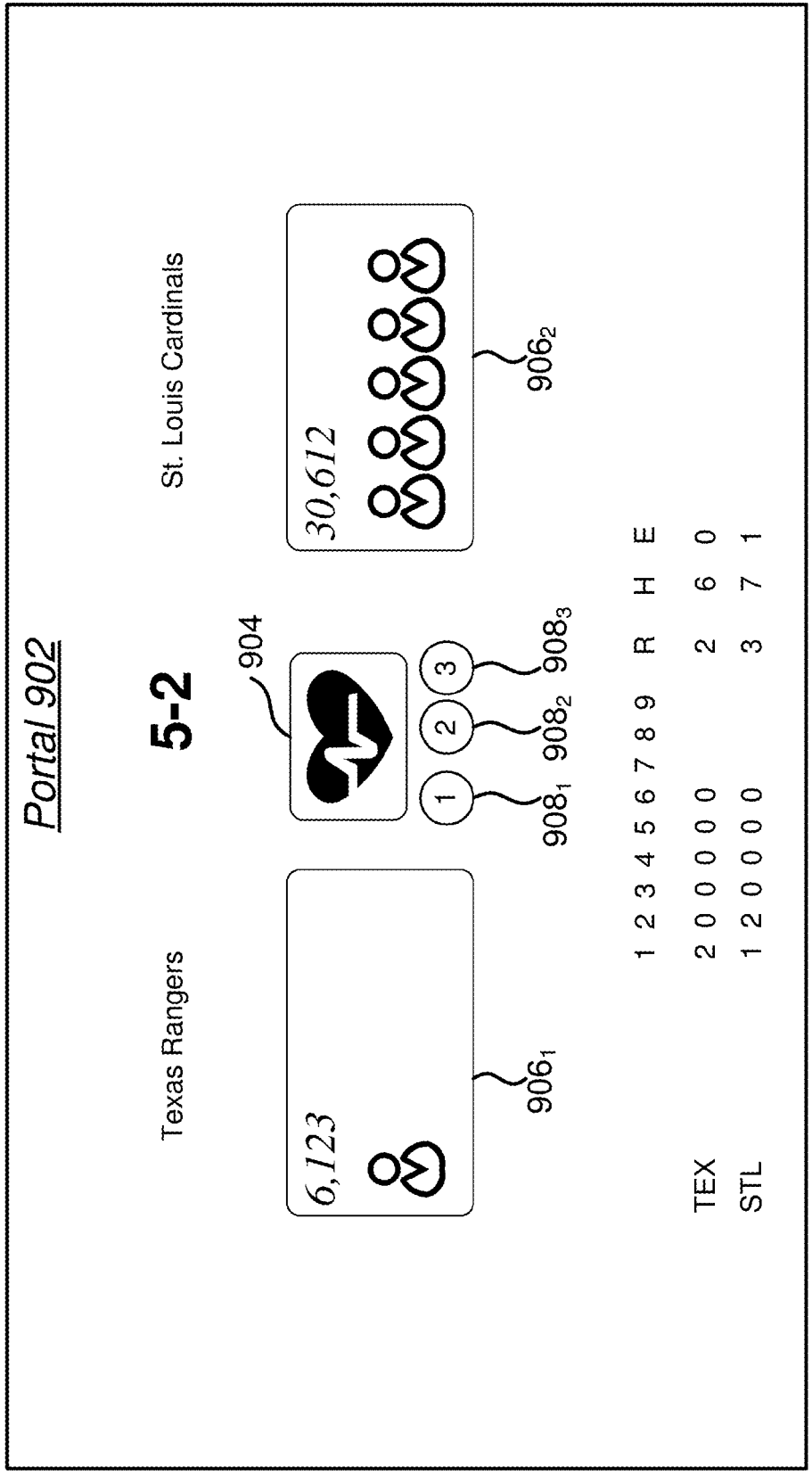
FIG. 9 illustrates an embodiment of a portal to facilitate a live audience experience on the computing device of FIG. 4.

FIG. 9 illustrates a user interface view 900 of a portal 902 for the application program 440 of FIG. 4. The user interface view 900 may represent a user's perception of the portal 902 presented through the user's computing device. As described herein, the portal 902 is operative to display rendered content comprising one or more visual indicators of an audience experience to a live baseball game. The portal 902 of FIG. 9 may augment the computing device's audio/video feed of the live baseball game, for example, as an extension to a browser component, a search engine page, or a mobile application.

The portal 902 may display a heart 904 to operate as a visual indicator for a rhythm or pulse of the baseball game. One example implementation of the portal 902 generated an animated beating heart with a pulse that corresponds to the pulse of the game. In some example embodiments, the portal 902 displays a visual indicator for each subset of the live audience, such as a graphic 906$_1$ to symbolize the Texas Rangers fans in attendance and a graphic 906$_2$ to symbolize the St. Louis Cardinals fans in attendance. Note, the portal 902 depicts more of the St. Louis Cardinals fans than the Texas Rangers fans because the baseball game is being played at the Cardinals' home stadium.

The portal 902 may further include one or more buttons 908$_1$, 908$_2$, and 908$_3$, each of which is a user interface element configured with an interaction mechanism. When the button 908$_1$, for instance, is activated, executable code for the interaction mechanism is invoked. One example interaction mechanism allows the user to submit a comment (e.g., like or dislike) pertaining to a specific moment in the game. Some comments are aggregated and may be presented as a visual indicator on the portal 902, such as animation with music. Another example interaction mechanism allows an out-of-stadium fan to join and shape the live audience experience by requesting the singing of the sport team's anthem.

As an alternative, the portal 902 of FIG. 9 represents an in-stadium screen that displays content to an entire live audience. The portal 902, in one example embodiment, generates the heart 904 as an animation representing the baseball game's pulse score. Naturally, since the baseball game is being held in St. Louis, the heart 904 would be configured to animate a beating heart when the hometown St. Louis Cardinals receive positive reactions. A different portal on another user's computing device (e.g., a mobile device) may be configured with that user's preference such that the heart 904 could also be configured to animate when Texas Rangers receive positive reactions. The graphic 906$_1$ and the graphic 906$_2$ may be presented on the in-stadium screen along with text to present various statistics, such as in-stadium fan density, the game's score and current pitcher/batter matchup.

Figure 10:
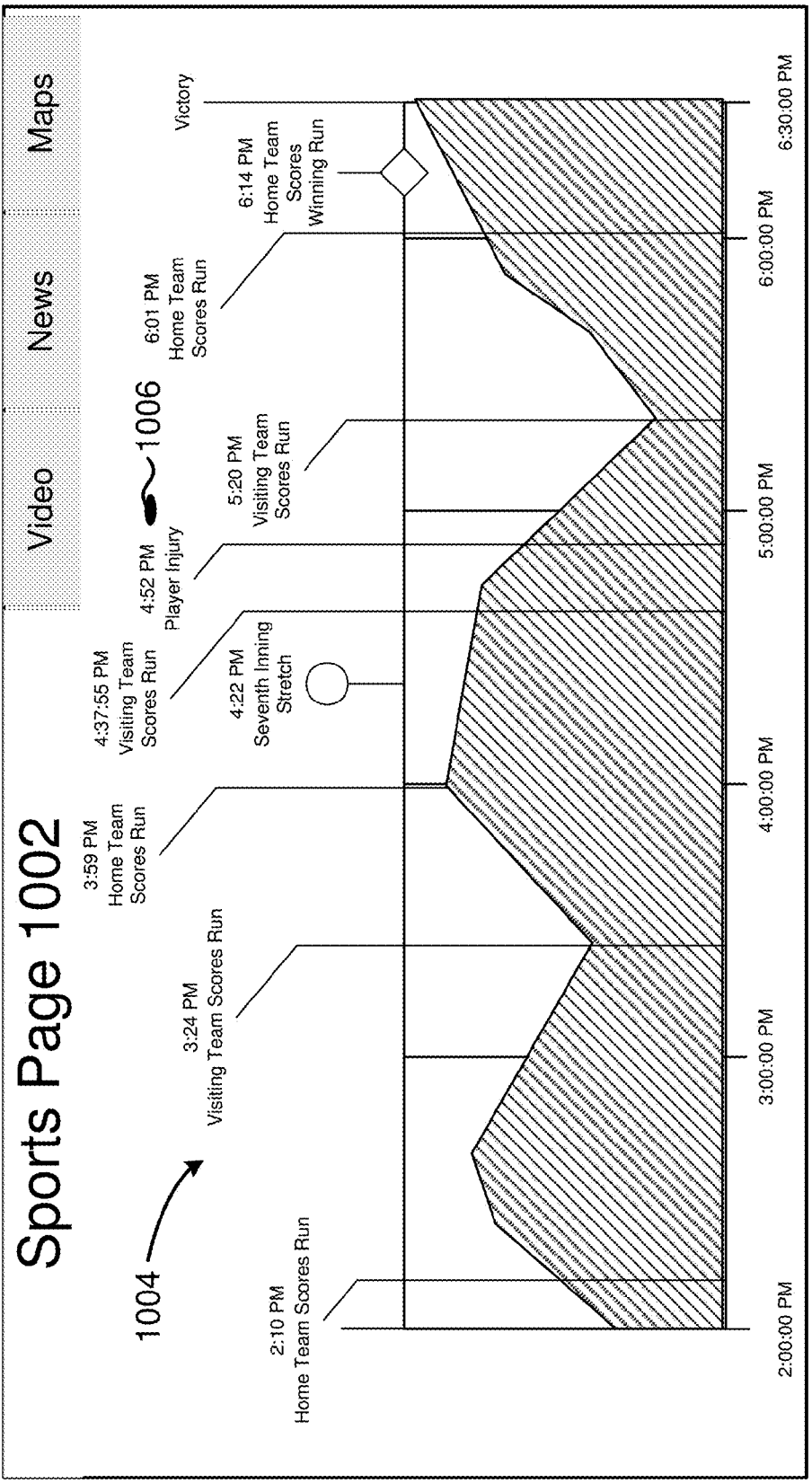
FIG. 10 illustrates an embodiment of a search engine page displayed on the computing device of FIG. 4.

FIG. 10 illustrates a search engine 1000 having a sports page 1002 displayed on a computing device as part of the search result set or triggered by a user action on the result set. In some embodiments, the sports page 1002 represents an extension to the search engine 100 as an additional portal or interface view whose content is populated by the API 120 of the system 100 of FIG. 1.

The sports page 1002 generates a timeline 1004 illustrating a baseball game's progress from start to finish in terms of the live audience' experience. As depicted in FIG. 10, the baseball game starts at 2 pm and ends at 6:30, a period of three and a half hours where the live audience's (mass) reactions through the game are recorded as pulse scores and transformed into a line graph showing changes to the live audience's emotional state. As described herein, the live audience may experience different emotional states and occasionally, those live audience members express one particular state or other in the form of a bodily movement. A home run, for example, may elicit excitement and cheering. Of course, a lack of any noticeable movement also may indicate communal unhappiness as the live audience's emotional state.

The timeline 1004 highlights at least some of the live audience's mass reactions to some of the game's moments. As illustrated in FIG. 10, the home team scores a run at the beginning of the game and accordingly, the live audience comprised mostly of home town fans reacts with joy, resulting in a pulse score increase. The live audience's joy begins to wane when the visiting team scores a run to tie the game at 3:25 PM. Almost immediately, the live audience's pulse scores begin to increase again denoting exciting baseball is being played by the home team. This increases results in a peak of excitement when the home town scores a run and takes the lead in the baseball game. The live audience's emotional state seems to neutralize as the seventh inning stretch provides them with a break in action. The pulse scores of the live audience plateau until game play resumes. In some embodiments, the timeline 1004 shows a gap for scheduled breaks.

After the seventh inning stretch, the visiting team scores a run at 4:37 PM to the tie the game, bringing the live audience into a depressed emotional state. If an umpire does not seem to be impartial, the home town fans in the live audience may voice their disagreement with that umpire's officiating through negative language. This depressed emotional state may be compounded further when a home town player is injured at 4:52 PM. For example, if a popular (e.g., franchise) player is badly injured and out for the season, the home town fans in the live audience may exhibit displeasure via small movements. If a player on the visiting team caused the injury, the live audience may react angry to show how upset they are through wild movements.

In some embodiments, an online audience member may view the search engine 1000 and activate a user interface element to display more information about a particular game moment. FIG. 10 illustrates, as an example, an information button 1006 that generates a dialog box with additional information about the injured player mentioned in the above paragraph. Such information may include the injured player's name, instant replay video of the injury, current season statistics and/or the like. The information button 1006 may execute code that retrieves third party data feeds about the game or the sport in general, including highlights and scores of other games. As an option, the online audience member may view commentary by other online audience members or live audience members. In another scenario, the search engine 1000 integrates $3^{rd}$ party feeds (e.g., a near-real time set of data for the moments within the event) with metadata for the player, the event itself and also commentary/textual description of the sports game). In this scenario, the search engine 1000 integrates the metadata (e.g., mapped moment types, such as a goal/run, a foul, a penalty, etc.), player names, and potentially commentary statements—for example "an amazing play by player x') and visualize such data as overlaid captions against the timeline 1004.

When the visiting team scores a run at 5:20 PM to lead the game by one run, the live audience's depressed emotional state hits a nadir. This may be expressed by sorrowful gestures and other movements expressing sadness. Some live audience may even leave the baseball game under the impression that the game is lost even though there is still time to come back and win. The live audience's emotional state quickly reverts back to joy when the home team scores a run to tie the game. Because of the unexpected turn in the game's progress in favor of the home town team, the live audience may express their sudden joy through happiness and extreme comradery. When the home town team scores the winning run in the baseball game, the live audience's joy culminates into celebration and even more comradery.

As one alternative to the above description, the timeline 1004 may be presented in a search engine results page, for instance, a search result listing. Any search using keywords for the baseball game may receive such a search result listing from the search engine 1000. As an option, the search result may be juxtaposed with a timeline for each other baseball game being played that day. In this manner, it is possible to compare several baseball games in terms of the live audience experience.

Figure 11:
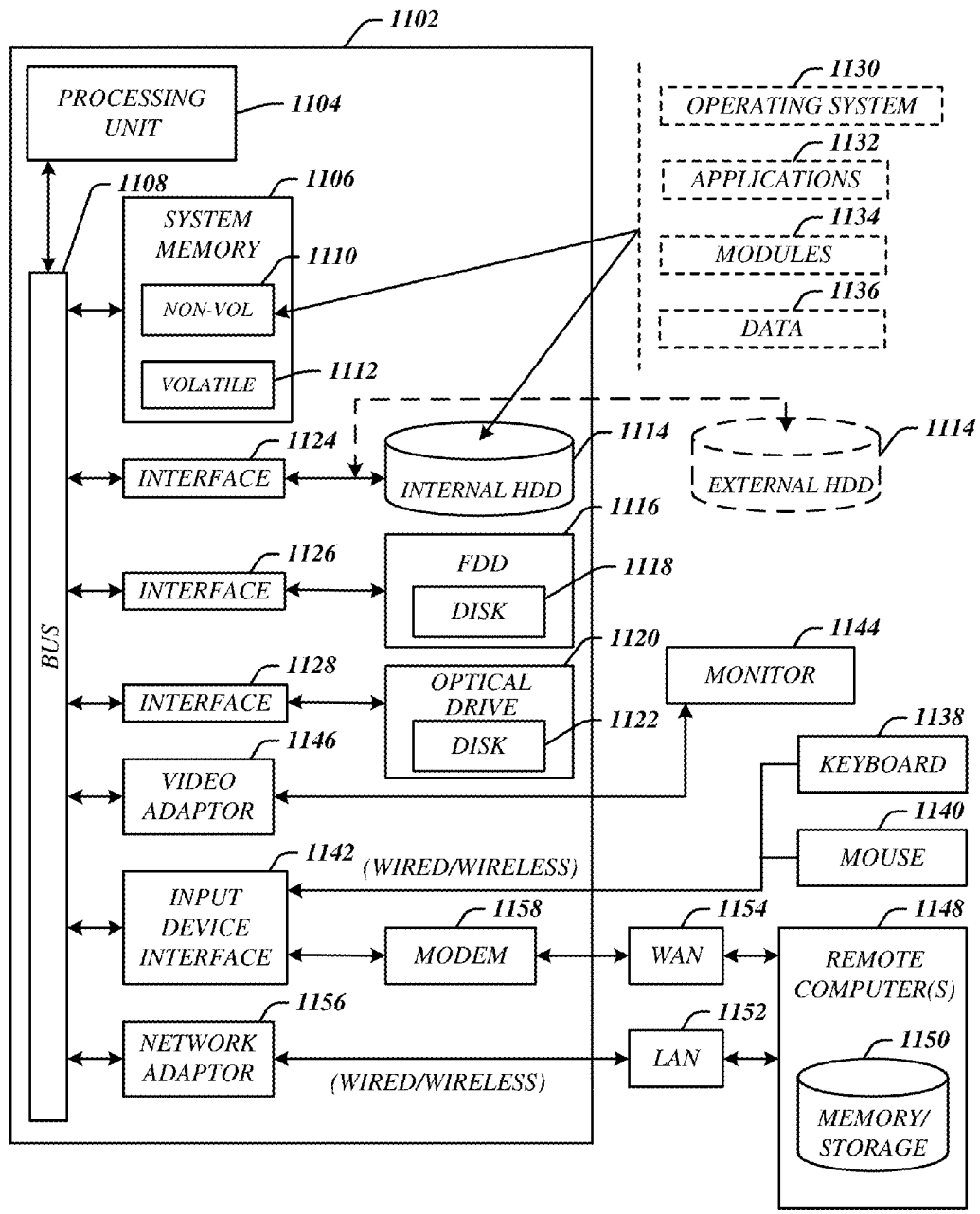
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
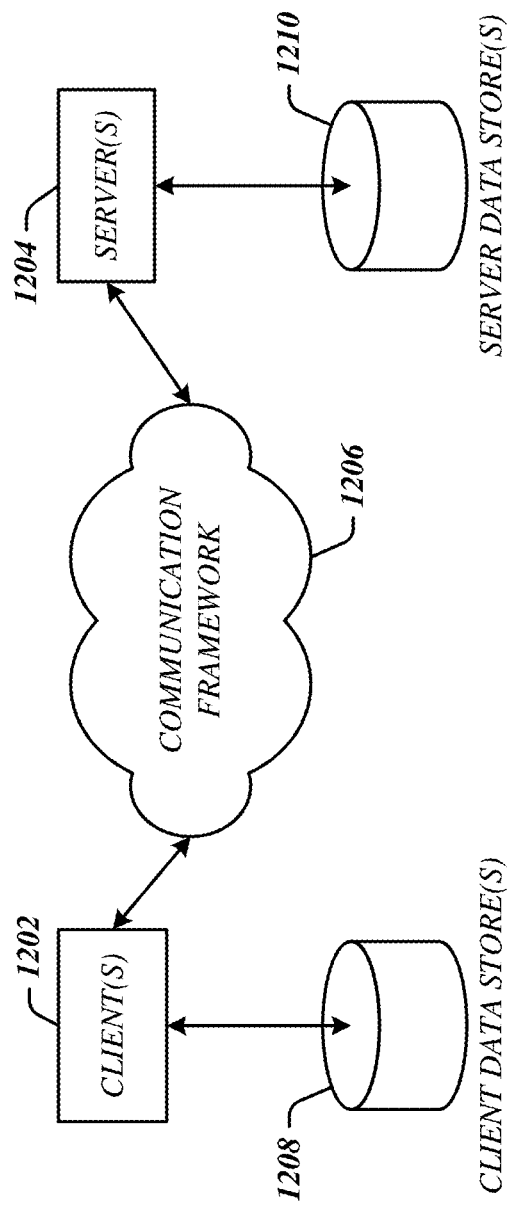
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the computing device 420. The servers 1204 may implement the apparatus 850. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.12a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

An apparatus or a system comprising a logic circuit and logic operative on the logic circuit to identify mass reaction indicia from motion data that corresponds to a first set of computing devices associated with a live audience and generate visual indicator data based upon the mass reaction indicia that is communicated to a second set of computing devices associated with an online audience. The logic may include various components that comprise an Application Programming Interface (API) operative to connect the first set of computing devices and the second set of computing devices. One or more of the various components may comprise API infrastructure to capture the motion data from mobile devices located within a geographic area of an event and determine whether to classify the mobile devices as at least part of the live audience. The API infrastructure of the apparatus is further configured to identify an event in a geographic area, locate the first set of computing devices within the geographic area, and identify appropriate content to display on the second set of computing devices without the geographic area. The logic in the apparatus may comprise an experience component operative to communicate the visual indicator data to a computing device to generate content for display through any of the following: an application running on a mobile device, a search engine running on a browser component, an application running on a connected television device, or an application running a wearable device.

A mobile application running on a computing device of the first set of computing devices is able to capture the motion data from mobile devices located within a geographic area of an event and determine whether to classify the mobile devices as at least part of the live audience. In one embodiment, the mobile application running on the computing device may be further operative to generate at least one button on an application running on the second set of computing devices, the at least one button to enable interaction with an event.

A computer-implemented method may be executed by the apparatus or the system described herein. The computer-implemented method further comprises the steps of identifying concurrent movement patterns among the set of computing devices located within the geographic area and within a time period, determining whether the concurrent movement patterns indicate a mass reaction, computing a pulse score based upon the concurrent movement patterns. The computer-implemented method may further comprise the step of correlating the mass reaction indicia with event data to identify content to display on the set of computing devices of the online audience.

At least one computer-readable storage medium comprising instructions that, when executed, cause a system to process a pulse score quantifying a current state of an event with respect to an emotional state of a live audience, render content based upon the pulse score and display the content in a portal configured to monitor the event. The at least one computer-readable storage medium may comprise further instructions that, when executed, cause the system to select a pulse score for an online audience member from different pulse scores based upon preference data for that online audience member and use the selected pulse score to display a visual indicator representing a mass reaction of a subset of a live audience. The at least one computer-readable storage medium may comprise further instructions that, when executed, cause the system to generate the portal as an extension to the application or a search engine.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a logic circuit; and
   logic operative on the logic circuit to:
      identify mass reaction indicia from motion data that corresponds to a first set of computing devices possessed by a plurality of members of a live audience in physical proximity to an event, the motion data being provided by one or more position determination systems of the computing devices of the first set of computing devices and being indicative of actual movement of the computing devices possessed by the plurality of members of the live audience in physical proximity to the event; and
      generate visual indicator data based upon the mass reaction indicia that is communicated to a second set of computing devices associated with an online audience.

2. The apparatus of claim 1, wherein the logic is further configured to determine whether one or more computing devices are within a geographic area in physical proximity to the event and determine whether to classify the one or more computing devices are to be included within the first set of computing devices possessed by the plurality of members of the live audience.

3. The apparatus of claim 1, wherein the logic is further configured to identify the event in a geographic area, locate the first set of computing devices within the geographic area, and identify appropriate content to display on the second set of computing devices without the geographic area.

4. The apparatus of claim 3, wherein the logic is further operative to identify additional computing devices within the geographic area and process motion data from the additional computing devices.

5. The apparatus of claim 1, wherein the logic is further operative to communicate the visual indicator data to enable generation of content for display through at least one of an application running on a mobile device, a search engine running on a browser component, an application running on a connected television device, or an application running a wearable device.

6. The apparatus of claim 1, wherein the logic is further operative to generate at least one button on an application running on the second set of computing devices, the at least one button to enable interaction with the event.

7. The apparatus of claim 1, wherein the logic is further operative to extend a search engine running on a client computer with a component to display a visual indicator of a live audience experience.

8. The apparatus of claim 1, wherein the logic is further operative to compute a pulse score for a subset of the live audience.

9. The apparatus of claim 1, wherein the logic is further operative to identify a visual indicator for a subset of the online audience.

10. The apparatus of claim 1, wherein the logic is configured to be a component on an application running on a mobile device of the first set of computing devices.

11. The computer-implemented method of claim 10 further comprising extending a browser component running on a computing device with a portal to display the visual indicator data.

12. The computer-implemented method of claim 10 further comprising correlating the mass reaction indicia with event data to identify content to display on the set of computing devices of the online audience.

13. A computer-implemented method, comprising:
   identifying mass reaction indicia from motion data that captures movements corresponding to a set of mobile devices possessed by a plurality of members located within a geographic area in physical proximity to an event, the motion data being provided by one or more position determination systems of the mobile devices of the set of mobile devices and being indicative of actual movement of the computing devices possessed by the plurality of members of the live audience in physical proximity to the event; and
   communicating visual indicator data that represents the mass reaction indicia to an application running on computing devices located outside of the geographic area.

14. The computer-implemented method of claim 13 further comprising identifying movement patterns among the set of computing devices located within the geographic area.

15. The computer-implemented method of claim 14 further comprising determining whether the concurrent movement patterns indicate a mass reaction.

16. The computer-implemented method of claim 15 further comprising computing a pulse score based upon the concurrent movement patterns.

17. The computer-implemented method of claim 13 further comprising identifying concurrent movement patterns within a time period.

18. A system comprising:
   one or more processing devices operatively coupled to a memory, the memory bearing one or more instructions that, when executed by the one or more processing devices, configure the system to perform one or more operations including:
      process a pulse score quantifying a current state of an event with respect to an emotional state of a live audience in physical proximity to the event, the pulse score being at least partly based on motion data provided by one or more position determination systems of a plurality of computing devices associated with a plurality of members of the live audience and being indicative of actual movement of the computing devices possessed by the plurality of members of the live audience in physical proximity to the event;

render content based upon the pulse score; and
display the content in a portal configured to monitor the event.

19. The system of claim 18 wherein the memory further bears one or more instructions that, when executed by the one or more processing devices, configure the system to perform one or more operations comprising:
select a pulse score for an online audience member from different pulse scores based upon preference data for that online audience member; and
use the selected pulse score to display a visual indicator representing a mass reaction of a subset of a live audience.

20. The system of claim 18 wherein the memory further bears one or more instructions that, when executed by the one or more processing devices, configure the system to perform one or more operations comprising:
generate the portal as an extension to the application.

* * * * *